United States Patent Office 2,906,767
Patented Sept. 29, 1959

2,906,767

ORGANOSILICON NITRILES

Leo H. Sommer, State College, Pa., assignor to Dow Corning Corporation, Midland, Mich., a corporation of Michigan No Drawing. Application March 20, 1957
Serial No. 647,213

7 Claims. (Cl. 260—448.2)

The present invention relates to certain organosilicon nitriles in monomeric, polymeric, or copolymeric form, and which are characterized by the structure $$(CH_2=CHCH_2)_{2-a}\underset{\underset{C\equiv N}{|}}{\overset{\overset{Z}{|}}{C}}[(CH_2)_3Si\equiv]_a$$

as explained in detail below.

The preparation of organosilicon nitriles characterized by a structure such as $$N\equiv C(CH_2)_4\overset{|}{\underset{|}{Si}}R$$

has been shown in my copending application No. 522,827 filed July 18, 1955. These can be prepared, for example, by reacting RHSiCl$_2$ with $$CH_2=CH(CH_2)_2C\equiv N$$

in the presence of a catalyst consisting of platinum deposited on charcoal. The dichlorosilane adduct is then hydrolyzed to prepare the corresponding siloxane. It will be noted that in such compounds the cyanide radical is in a terminal position with respect to the silicon atom.

I have now found that organosiloxanes having improved properties, particularly in regard to the strength and/or stiffness of rubbers or resins prepared therefrom, can be obtained when the cyanide radical is in a non-terminal position according to that illustrated above. Thus this invention relates to (1) monomeric silanes having the formula $$(CH_2=CHCH_2)_{2-a}\underset{\underset{C\equiv N}{|}}{\overset{\overset{Z}{|}}{C}}[(CH_2)_3SiR_xY_{3-x}]_a$$

where R is a monovalent hydrocarbon radical free of aliphatic unsaturation, Y is of the group Cl, Br, and alkoxy, Z is of the group H and —COOR' where R' is an alkyl radical of from 1 to 8 inclusive carbon atoms, $a$ is an integer of from 1 to 2 inclusive, and $x$ is an integer of from 0 to 2 inclusive, and (2) siloxanes containing polymeric units of the formula $$(CH_2=CHCH_2)_{2-a}\underset{\underset{C\equiv N}{|}}{\overset{\overset{Z}{|}}{C}}[(CH_2)_3SiR_xO_{\frac{3-x}{2}}]_a$$

where R, Z, $a$, and $x$ are as above defined.

The monomers where Z is the radical —COOR' can be prepared by reacting R$_x$HSiY$_{3-x}$ with the appropriate alkyl diallylcyanoacetate, R and $x$ being as above defined, in the presence of platinum deposited on charcoal or chloroplatinic acid as a catalyst. The silane can add to one allyl group to form those compounds where $a$ is 1 or to both groups to form those compounds wherein $a$ is 2. Both products are formed to some extent regardless of reaction conditions, but the relative amounts of either can of course be greatly influenced by maintaining one or the other of the reactants in excess. The reaction can be represented as follows:

2(CH$_2$=CHCH$_2$)$_2$C(CN)(COOR')+3R$_x$HSiY$_{3-x}$→
(CH$_2$=CHCH$_2$)C(CN)(COOR')[(CH$_2$)$_3$SiR$_x$Y$_{3-x}$]+
[Y$_{3-x}$R$_x$Si(CH$_2$)$_3$]C(CN)(COOR')[(CH$_2$)$_3$SiR$_x$Y$_{3-x}$]

In the silane reactant, R can be any monovalent hydrocarbon radical free of aliphatic unsaturation, e.g. alkyl such as methyl, ethyl, propyl, and octadecyl; aryl such as phenyl and xenyl; cycloaliphatic such as cyclohexyl, alkaryl such as tolyl, and aralkyl such as benzyl. Where more than one R radical is present on a particular silicon atom it can represent the same or different radicals. Y can be Cl, Br, or an alkoxy radical, and of the latter a radical of from 1 to 8 inclusive carbon atoms is preferred. The Y radicals can also be the same or different radicals. Examples of preferred silane reactants include HSiCl$_3$, MeHSiCl$_2$, MeHSi(OEt)Cl, MePhHSi(OEt), Ph$_2$HSi(OMe), HSiBr$_3$, and PhHSi(OBu)$_2$ The symbols Me, Et, Bu, and Ph are used above and throughout this specification to represent methyl, ethyl, butyl, and phenyl radicals respectively.

In the cyanoacetate reactant, R' is an alkyl radical of from 1 to 8 inclusive carbon atoms, e.g., methyl, ethyl, and octyl.

The monomers where Z is a hydrogen atom are prepared in the same manner, except that diallylacetonitrile [i.e. (CH$_2$=CHCH$_2$)$_2$CHCN] is the reactant in place of the alkyl diallylcyanoacetate. Here again the silane can add to either one or both of the allyl radicals to form the corresponding monomeric adducts.

In the reactions by which all of the above monomers are prepared, the optimum reaction temperature varies over a wide range, depending not only upon the particular reactants present but also upon the type and amount of catalyst employed. Ordinarily a reaction temperature in the region of 100 to 175° C. is preferred. Atmospheric, or sub- or superatmospheric pressures can be employed as desired.

The chloroplatinic acid catalyst is preferably employed in the form of the hexahydrate, H$_2$PtCl$_6$·6H$_2$O. Since only minute amounts are needed (in the region of 1×10$^{-4}$ to 1×10$^{-7}$ mole per mole of the silane), handling is facilitated by the use of a solution of the acid in an appropriate solvent, e.g. in an alcohol such as isopropanol or a glycol ether such as the dimethylether of diethylene glycol. In general this catalyst permits the use of less platinum, lower reaction temperatures, and a shorter reaction time than when platinum deposited on charcoal (hereafter designated Pt/C) is the catalyst.

The Pt/C catalysts are available commercially, or they can be prepared by dissolving H$_2$PtCl$_6$·6H$_2$O in water, neutralizing to a pH of about 10 with KOH, suspending charcoal in the solution, bubbling hydrogen through the slurry to precipitate the platinum, and then washing and drying the finely divided solids. It is preferable that the final catalyst contain from about 1 to 5 percent Pt by weight, and the catalyst mass itself is generally employed in an amount of about 0.5 to 2 percent by weight based on the weight of the silane. Large excesses of either the acid or Pt/C catalysts can be present in the reaction with no particular harm to the system, but are of course undersirable from the economical standpoint.

The monomeric silanes of this invention can be hydrolyzed, by contacting them with water in the usual manner of halo- or alkoxysilane hydrolysis, to form the corresponding siloxanes. If a single monomer of this type is employed, the product is a homopolymer. If two or more of these monomers are cohydrolyzed, the product is a copolymer. In either case the siloxane consists essentially of units of the formula $$(CH_2=CHCH_2)_{2-a}\underset{\underset{C\equiv N}{|}}{C}[(CH_2)_3SiR_xO_{\frac{3-x}{2}}]_a$$

as defined above. Such polymers tend to be resinous when $x$ has an average value of from 0 up to about 0.9, then of a rubbery or viscous fluid nature up to an average value of about 1.1, then of a decreasingly viscous fluid nature as the value rises to 2.

A second type of copolymer within the scope of this invention is that which contains both polymeric units of the above type and units of the formula $$R''_bSiO_{\frac{4-b}{2}}$$

preferably there being at least 0.1 molar percent of the former units present. In the latter units, $R''$ represents monovalent hydrocarbon radicals or halogenated monovalent hydrocarbon radicals and $b$ is an integer of from 0 to 3 inclusive. Although $b$ can be 0 in some of the individual units, its average value when considering all of such units present in the copolymer should be from 0.8 to 3 inclusive. Thus the latter units will be of the type $R''SiO_{1.5}$, $R''_2SiO$, and $R''_3SiO_{.5}$, along with $SiO_2$ units to the extent that the average number of $R''$ radicals is maintained up to at least 0.8 per Si atom in the polymeric units in question. The $R''$ radicals can be the same or different radicals within any particular unit or within the whole copolymeric radical.

Examples of suitable $R''$ radicals include any of the R radicals illustrated above, as well as alkenyl radicals such as vinyl, allyl, hexenyl and cyclohexenyl; and halogenated monovalent hydrocarbon radicals such as chlorophenyl, dichlorophenyl, bromophenyl, tetrabromoxenyl, tetrafluoroethyl, $\alpha,\alpha,\alpha$-trifluorotolyl, chlorovinyl, and 1,1,1-trifluoropropyl radicals. As is usual with organosilicon compounds, those polymers and copolymers in which R and $R''$ are methyl and/or phenyl radicals are preferred for their thermal stability. Thus when any $R''$ substituted polymeric units are present it is preferred that they be of the formula $$(CH_3)_b(C_6H_5)_cSiO_{\frac{4-b-c}{2}}$$

where $b$ is 0 to 3 inclusive, $c$ is 0 to 2 inclusive, the sum of $b+c$ is not greater than 3, and the average value of the sum of $b+c$ is from 0.8 to 3 inclusive.

Copolymers of the type discussed above can be prepared by the cohydrolysis of any one or more of the monomers of this invention as mixed with one or more monomers of the formula $R''_bSiY_{4-b}$ where $R''$, Y, and $b$ are as defined above. The latter are well-known materials, many of which are commercially available. The usual and well-known techniques of organosilicon hydrolysis are applicable.

Similar copolymers can be prepared by the catalytic copolymerization of the corresponding siloxanes, providing all such siloxanes are in a fluid state or solvent soluble state prior to the copolymerization thereof. The well-known acid or alkaline siloxane rearrangement catalysts can be employed in the latter method, provided that conditions are such that the nitrile or —COOR' groups are not hydrolyzed. In general it is preferable to carry out the copolymerization under anhydrous conditions and at temperatures below 100° C. Polar solvents such as acetonitrile can be used to facilitate the interaction and copolymerization if desired. It is to be understood that the defined siloxane polymers and copolymers of this invention can contain small amounts of unhydrolyzed Y radicals or uncondensed OH radicals attached to some of the silicon atoms therein, as is conventional with the vast majority of organosiloxane polymers.

The resinous, rubbery, or fluid nature of the polymers and copolymers herein will depend largely upon the average degree of substitution (i.e., the ratio of total organic groups to total silicon atoms), following much the usual pattern of organosiloxane polymers. The products are useful in the same applications as the well-known "silicone" fluids, resins, and rubbers, e.g. as potting and sealing compounds, electrical insulation, gasketing, impregnating varnishes, and the like; and if desired can be used in conjunction with the conventional fillers such as silica aerogel, fume silica, titania, crushed quartz, ferric oxide, zinc oxide, and asbestos or glass fibers. Rubbers can be prepared from the polymers and copolymers having an average degree of substitution of about 2.0 by the usual organosiloxane rubber compounding techniques, and they are characterized by an improved resistance to swelling in hydrocarbon solvents.

The following examples are illustrative only.

*Example 1*

A slight theoretical excess of $Me_2HSiCl$ was added to 0.3 mole of ethyl diallylcyanoacetate in the presence of 0.5 g. of a Pt/C catalyst containing 2 percent by weight Pt. The addition was carried out with the temperature maintained in the region of 150°–160° C. The reaction mass was filtered and distilled, yielding two products:

(A) $[ClMe_2Si(CH_2)_3]C(CH_2CH=CH_2)(CN)(COOEt)$ boiling at 148° C./6 mm. Hg, and (B)

$$[ClMe_2Si(CH_2)_3]_2C(CN)(COOEt)$$

boiling at 171° C./3 mm. Hg. When the A product is dissolved in toluene, the solution added to an excess of water, the hydrolyzate washed free of acid and toluene removed therefrom by flash distillation, a fluid polymer is obtained of the formula $$[(CH_2=CHCH_2)C(CN)(COOEt)(CH_2CH_2CH_2\underset{\underset{Me}{|}}{\overset{\overset{Me}{|}}{Si}}-)]_2O$$

Hydrolysis of the B product in the same fashion provides a very viscous fluid containing polymeric units of the formula $$[O_{.5}\underset{\underset{Me}{|}}{\overset{\overset{Me}{|}}{Si}}(CH_2)_3]C(CN)(COOEt)[(CH_2)_3\underset{\underset{Me}{|}}{\overset{\overset{Me}{|}}{Si}}O_{.5}]$$

*Example 2*

By the method of Example 1, 1.1 moles $Me_2HSiCl$ was reacted with 0.5 mole diallylacetonitrile in the presence of 1 g. of 2 percent Pt/C catalyst. Again distillation of the reaction mass yielded two product fractions:

(A) $[ClMe_2Si(CH_2)_3]CH(CH_2CH=CH_2)(CN)$ boiling at 93° C./3 mm. Hg, and (B)

$$[ClMe_2Si(CH_2)_3]_2CH(CN)$$

boiling at 142° C./3 mm. Hg. Hydrolysis of these two fractions as in Example 1 produces the corresponding disiloxane fluid $$[(CH_2=CHCH_2)CH(CN)-(CH_2CH_2CH_2\underset{\underset{Me}{|}}{\overset{\overset{Me}{|}}{Si}}-)]_2O$$

and a very viscous fluid containing polymeric units of the formula $$[O_{.5}\underset{\underset{Me}{|}}{\overset{\overset{Me}{|}}{Si}}(CH_2)_3]CH(CN)[(CH_2)_3\underset{\underset{Me}{|}}{\overset{\overset{Me}{|}}{Si}}O_{.5}]$$

*Example 3*

When 1.1 moles $PhHSiBr_2$ is reacted with 0.5 mole diallylacetonitrile by the method of Example 1, there are obtained the two products: (A)

$$[Br_2PhSi(CH_2)_3]CH(CH_2CH=CH_2)(CN)$$

and (B) [Br₂PhSi(CH₂)₃]₂CH(CN). When the A product is hydrolyzed according to Example 1, a viscous polymer of the type $$(CH_2=CHCH_2)CH(CN)(CH_2CH_2CH_2\overset{\underset{\mid}{Ph}}{Si}O)$$

is obtained. Hydrolysis of the B product gives a polysiloxane containing units of the formula $$[O\overset{\underset{\mid}{Ph}}{Si}(CH_2)_3]CH(CN)[(CH_2)_3\overset{\underset{\mid}{Ph}}{Si}O]$$

Example 4

To 0.2 mole diallylacetonitrile containing 0.25 g. of 5 percent Pt/C there was added 0.4 mole Me₂HSi(OEt). The mixture was heated overnight at 100°–140° C., and upon filtration and distillation there were obtained two product fractions: (A)

$$[(EtO)Me_2Si(CH_2)_3]CH(CN)(CH_2CH=CH_2)$$

boiling at 135° C./13 mm. Hg, $n_D^{20}$ 1.4410, $d_4^{25}$ 0.8847; and (B) [(EtO)Me₂Si(CH₂)₃]₂CH(CN) boiling at 150° C./3 mm. Hg, $n_D^{20}$ 1.4406, $d_4^{20}$ 0.9020.

Example 5

The reaction of HSiCl₃ and diallylacetonitrile in the manner of Example 1 produces the compounds $$[Cl_3Si(CH_2)_3]CH(CH_2CH=CH_2)CN \text{ and}$$

$$[Cl_3Si(CH_2)_3]_2CH(CN)$$

When a mixture containing 1 mole of each of these compounds, 1 mole of PhMeSiCl₂, 1 mole Cl₂C₆H₃SiCl₃, 0.9 mole (F₃CCH₂CH₂)Me₂SiCl and 0.1 mole Si(OEt)₄ is mixed with an equal weight of toluene and added to an excess of water, the washed cohydrolyzate is a toluene solution of a resinous copolymer containing 20 molar percent each of polymeric units of the formula $$(CH_2=CHCH_2)CH(CN)(CH_2CH_2CH_2SiO_{1.5})$$

[O₁.₅Si(CH₂)₃]CH(CN)[(CH₂)₃SiO₁.₅], PhMeSiO, and Cl₂C₆H₃SiO₁.₅, with 18 molar percent $$(F_3CCH_2CH_2)Me_2SiO_{.5}$$

and 2 molar percent SiO₂ units.

Example 6

The reaction of MeHSiCl₂ and ethyl diallylcyanoacetate in the manner of Example 1 produces the compounds (A)

$$[Cl_2MeSi(CH_2)_3]C(CH_2CH=CH_2)(CN)(COOEt)$$

and (B) [Cl₂MeSi(CH₂)₃]₂C(CN)(COOEt). When a mixture of 0.8 mole of (A), 2 moles MeSiCl₃, 1 mole PhSiCl₃ and 0.2 mole Ph₂SiCl₂ is dissolved in toluene and cohydrolyzed by adding it to an excess of water, the washed cohydrolyzate is a toluene solution of a resinous copolymer containing 20 molar percent $$(CH_2=CHCH_2)C(CN)(COOEt)$$
$$[CH_2CH_2CH_2Si(Me)O]$$

units, 50 molar percent MeSiO₁.₅ units, 25 molar percent PhSiO₁.₅ units, and 5 molar percent Ph₂SiO units. When an equimolar mixture of (B) and CH₂=CHSiCl₃ is cohydrolyzed in the same manner, a resinous copolymer is obtained which contains 50 molar percent of units of the formula $$[OSi(Me)(CH_2)_3]C(CN)(COOt)[(CH_2)_3(Me)SiO]$$

and 50 molar percent of units of the formula $$CH_2=CHSiO_{1.5}$$

Example 7

The reaction of MeHSiCl₂ and diallylacetonitrile in the manner of Example 1 produces the compounds (A)

$$[Cl_2MeSi(CH_2)_3](CHCH_2CH=CH_2)(CN) \text{ and (B)}$$
$$[Cl_2MeSi(CH_2)_3]_2CHCN$$

Hydrolysis of the B product gives a viscous sticky polysiloxane containing units of the formula $$[OSi(Me)(CH_2)_3]CH(CN[(CH_2)_3(Me)SiO]$$

The latter can be mixed with an equimolar amount of (Me₂SiO)₄ and 1 percent by weight of sulfuric acid, and upon standing at room temperature a rubbery copolymer is obtained containing the above units and Me₂SiO units.

That which is claimed is:

1. An organosilicon nitrile having the formula $$(CH_2=CHCH_2)_{2-a}\overset{\underset{\mid}{Z}}{C}[(CH_2)_3SiR_xY_{3-x}]_a$$
$$\underset{\mid}{C\equiv N}$$

where R is a monovalent hydrocarbon radical free of aliphatic unsaturation, Y is of the group consisting of Cl, Br, and alkoxy, Z is of the group consisting of H and —COOR' where R' is an alkyl radical of from 1 to 8 inclusive carbon atoms, a is an integer of from 1 to 2 inclusive, and x is an integer of from 0 to 2 inclusive.

2. An organosilicon nitrile having the formula $$(CH_2=CHCH_2)_{2-a}CH[(CH_2)_3Si(CH_3(CH_3)_2Cl]_a$$
$$\underset{\mid}{C\equiv N}$$

where a is an integer of from 1 to 2 inclusive.

3. An organosilicon nitrile having the formula $$(CH_2=CHCH_2)_{2-a}C(COOC_2H_5)[(CH_2)_3Si(CH_3)_2Cl]_a$$
$$\underset{\mid}{C\equiv N}$$

where a is an integer of from 1 to 2 inclusive.

4. An organosilicon nitrile having the formula $$(CH_2=CHCH_2)_{2-a}CH[(CH_2)_3Si(CH_3)_2(OC_2H_5)]_a$$
$$\underset{\mid}{C\equiv N}$$

where a is an integer of from 1 to 2 inclusive.

5. An organosiloxane in which at least 0.1 molar percent of the polymeric units are of the formula $$(CH_2=CHCH_2)_{2-a}\overset{\underset{\mid}{Z}}{C}[(CH_2)_3SiR_xO_{\frac{3-x}{2}}]_a$$
$$\underset{\mid}{C\equiv N}$$

where R is a monovalent hydrocarbon radical free of aliphatic unsaturation, Z is selected from the group consisting of H and —COOR' where R' is an alkyl radical of from 1 to 8 inclusive carbon atoms, a is an integer of from 1 to 2 inclusive, and x is an integer of from 0 to 2 inclusive, the remaining polymeric units being of the formula $$R''_bSiO_{\frac{4-b}{2}}$$

where b is an integer of from 0 to 3 inclusive and has an average value of from 0.8 to 3 inclusive, and R'' is selected from the group consisting of monovalent hydrocarbon radicals and halogenated monovalent hydrocarbon radicals.

6. An organosiloxane in which at least 0.1 molar percent of the polymeric units are of the formula $$(CH_2=CHCH_2)_{2-a}CH[(CH_2)_3SiO_{\frac{3-a}{2}}]_a$$
$$\underset{\mid}{C\equiv N} \quad \underset{\mid}{(CH_3)_x}$$

where a is an integer of from 1 to 2 inclusive and x is an integer of from 0 to 2 inclusive the remaining polymeric units being of the formula $$(CH_3)_b(C_6H_5)_cSiO_{\frac{4-b-c}{2}}$$

where b is an integer of from 0 to 3 inclusive, c is an integer of from 0 to 2 inclusive, and the sum of b+c is not greater than 3, the average value of the sum of b+c in said remaining polymeric units being from 0.8 to 3 inclusive.

7. An organosiloxane in which at least 0.1 molar percent of the polymeric units are of the formula

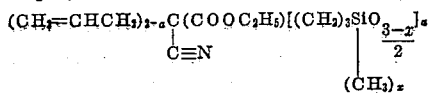

where $a$ is an integer of from 1 to 2 inclusive and $x$ is an integer of from 0 to 2 inclusive, the remaining polymeric units being of the formula

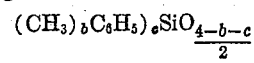

where $b$ is an integer of from 0 to 3 inclusive, $c$ is an integer of from 0 to 2 inclusive, and the sum of $b+c$ is not greater than 3, the average value of the sum of $b+c$ in said remaining polymeric units being from 0.8 to 3 inclusive.

References Cited in the file of this patent

FOREIGN PATENTS

| | | | |
|---|---|---|---|
| 1,116,725 | France | Feb. 6, | 1956 |
| 1,116,726 | France | Feb. 6, | 1956 |

UNITED STATES PATENT OFFICE
Certificate of Correction

Patent No. 2,906,767                                                                                September 29, 1959

Leo H. Sommer

It is hereby certified that error appears in the printed specification of the above numbered patent requiring correction and that the said Letters Patent should read as corrected below.

Column 5, line 66, the formula should read as shown below instead of as in the patent:

[OSi(Me)(CH₃)]₃C(CN)(COOEt)[(CH₃)₂(Me)SiO]

column 6, line 22, the formula should read as shown below instead of as in the patent:

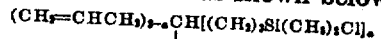

line 60, the formula should read as shown below instead of as in the patent:

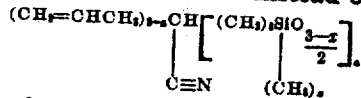

column 7, line 10, the formula should read as shown below instead of as in the patent:

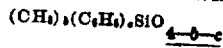

Signed and sealed this 3rd day of May 1960.

[SEAL]

Attest:
KARL H. AXLINE,
*Attesting Officer.*

ROBERT C. WATSON,
                                                      *Commissioner of Patents.*